US011621955B2

(12) United States Patent
Abt, Jr. et al.

(10) Patent No.: US 11,621,955 B2
(45) Date of Patent: Apr. 4, 2023

(54) DELIVERING DIGITAL IDENTITY DOCUMENTS THAT ARE VETTED AS TRUSTED IN A SECURED MANNER

(71) Applicant: International Business Machines Corporation, Armonk, NY (US)

(72) Inventors: William F. Abt, Jr., Nashua, NH (US); Daniel A. Gisolfi, Hopewell, NY (US); Asher C. Johnson, Austin, TX (US); Richard Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1338 days.

(21) Appl. No.: 15/091,065

(22) Filed: Apr. 5, 2016

(65) Prior Publication Data

US 2017/0288877 A1    Oct. 5, 2017

(51) Int. Cl.
*H04L 9/40* (2022.01)
*H04L 9/32* (2006.01)
*H04L 9/08* (2006.01)

(52) U.S. Cl.
CPC .......... *H04L 63/0861* (2013.01); *H04L 9/088* (2013.01); *H04L 9/0894* (2013.01);
(Continued)

(58) Field of Classification Search
CPC ....... H04L 9/00; H04L 63/00; H04L 2209/00; H04L 2463/00; H04L 60/00; G06C 1/00; G06C 5/00
(Continued)

(56) References Cited

U.S. PATENT DOCUMENTS 6,249,768 B1    6/2001  Tulskie, Jr. et al.
6,714,947 B2    3/2004  Fa
(Continued)

FOREIGN PATENT DOCUMENTS

WO    WO-2009070430 A2 *  6/2009  ............. G06F 21/32

OTHER PUBLICATIONS

"I want to have username as url parameter, Mar. 18, 2012, Stack Overflow, located at https://stackoverflow.com/questions/9762551/i-want-to-have-username-as-url-parameter" (Year: 2012).*
(Continued)

*Primary Examiner* — Neha Patel
*Assistant Examiner* — Nilesh B Khatri
(74) *Attorney, Agent, or Firm* — Robert A. Voigt, Jr.; Shackelford, Bowen, McKinley & Norton, LLP

(57) ABSTRACT

A method, system and computer program product for delivering a digital identity document. A request is received to purchase a digital identity document from a user by a system. An acquisition uniform resource locator (URL) with parameters corresponding to the identity of the user and the requested digital identity document is created and provided to the user. The user utilizes the received URL to communicate with an issuer to request the digital identity document. The system then receives the requested digital identity document in encrypted form from the issuer. The system then delivers the encrypted digital identity document to the user. In this manner, the system can deliver to the user an identity document in digital form that has been vetted as trusted in a secure manner thereby reducing the number of occurrences in providing improper identity documents as well as lessening the ability to generate falsified identity documents.

20 Claims, 5 Drawing Sheets

(52) U.S. Cl.
CPC ........ *H04L 9/3271* (2013.01); *H04L 63/0435* (2013.01); *H04L 63/061* (2013.01); *H04L 63/062* (2013.01); *H04L 63/08* (2013.01); *H04L 63/12* (2013.01); *H04L 2209/60* (2013.01)

(58) Field of Classification Search
USPC ................ 705/50, 51, 55, 56, 64, 71, 73, 76
See application file for complete search history.

(56) References Cited

U.S. PATENT DOCUMENTS

| | | | |
|---|---|---|---|
| 7,251,613 B2 | 7/2007 | Flores et al. | |
| 8,577,713 B2 | 11/2013 | Henderson et al. | |
| 8,875,235 B1 | 10/2014 | Hakimian et al. | |
| 9,449,182 B1* | 9/2016 | Dang | H04L 51/04 |
| 2004/0024848 A1* | 2/2004 | Smith | G06F 17/3089 |
| | | | 709/219 |
| 2007/0239843 A1* | 10/2007 | Knowles | G06F 16/93 |
| | | | 709/217 |
| 2008/0046984 A1* | 2/2008 | Bohmer | H04L 63/0853 |
| | | | 726/5 |
| 2010/0050252 A1* | 2/2010 | King | G06F 21/604 |
| | | | 726/21 |
| 2011/0204142 A1 | 8/2011 | Rao | |
| 2012/0110515 A1* | 5/2012 | Abramoff | G06F 16/904 |
| | | | 715/854 |
| 2014/0013114 A1* | 1/2014 | Redpath | H04L 63/12 |
| | | | 713/168 |
| 2015/0032840 A1* | 1/2015 | Daly, Jr. | H04L 63/102 |
| | | | 709/216 |
| 2015/0059003 A1 | 2/2015 | Bouse | |
| 2016/0050213 A1 | 2/2016 | Storr | |
| 2016/0188547 A1* | 6/2016 | Cruzada | G06F 17/211 |
| | | | 715/749 |
| 2017/0085385 A1* | 3/2017 | Kilduff | G06F 17/30011 |
| 2017/0230361 A1* | 8/2017 | Toth | H04L 63/08 |
| 2017/0243424 A1* | 8/2017 | Shirai | H04W 12/06 |
| 2017/0324750 A1* | 11/2017 | Khan | H04W 12/068 |
| 2018/0173871 A1* | 6/2018 | Toth | H04W 12/126 |
| 2018/0302224 A1* | 10/2018 | Wilson | H04L 63/0853 |

OTHER PUBLICATIONS

"Using Public Keys for Authentication, Mar. 1, 2015, WinSCP.net, located at https://web.archive.org/web/20150301001301/https://winscp.net/eng/docs/public_key" (Year: 2015).*

William Stallings, ICAM: A Foundation for Trusted Identities in Cyberspace, Jan. 1, 2016, IEEE, pp. 26-33 (Year: 2016).*

Asher C. Johnson et al., "Mobile Identity You are the Center of Your Identity," handout and demonstration thereof provided at the American Association of Motor Vehicle Administrators' Worship and Law Institute Conference held on Mar. 9-10, 2016 in Cincinnati, Ohio, one page, Grace Period Disclosure.

* cited by examiner

DELIVERING DIGITAL IDENTITY DOCUMENTS THAT ARE VETTED AS TRUSTED IN A SECURED MANNER

The following disclosure(s) are submitted under 35 U.S.C. 102(b)(1)(A):

Asher C. Johnson et al., "Mobile Identity You are the Center of Your Identity," handout and demonstration thereof provided at the American Association of Motor Vehicle Administrators' Worship and Law Institute Conference held on Mar. 9-10, 2016 in Cincinnati, Ohio.

TECHNICAL FIELD

The present invention relates generally to identity documents, and more particularly to delivering digital identity documents that are vetted as trusted in a secured manner.

BACKGROUND

Currently, institutions, such as government agencies (e.g., department of motor vehicles), issue identity cards or documents which may be used to identify a person or verify aspects of a person's personal identity. Identity documents may include, for example, a driver's license, a fishing license, a hunting license, a passport, a health insurance card, a firearm owner's identification card, a boating license, a commercial driver's license, etc. Typically, such identity documents are issued in the form of a thermal plastic card or paper by these institutions (also referred to as "issuer") based on user data (e.g., name, address, birthdate, height, etc. of the user) stored in databases.

Unfortunately, by relying upon thermal plastic cards or paper, problems may arise, such as providing improper identity documents as well as the ease in generating falsified identity documents. For example, incorrectly printed driver licenses may have been mailed to non-citizens. For instance, such driver licenses may not indicate the status of the recipient being a non-citizen. In such a situation, such driver licenses will need to be reprinted. Furthermore, there is not an easy solution in obtaining those incorrectly printed driver licenses to prevent abuse in the driving system and elsewhere.

Hence, the current process in issuing identity documents in the form of thermal plastic cards or paper is deficient in terms of security and accuracy.

SUMMARY

In one embodiment of the present invention, a method for delivering a digital identity document comprises receiving a request to purchase a digital identity document from a user. The method further comprises creating, by a processor, an acquisition uniform resource locator with parameters corresponding to an identity of the user and the requested digital identity document. The method additionally comprises providing, by the processor, the created acquisition uniform resource locator to the user to be used by the user to request the digital identity document from an issuer. Furthermore, the method comprises receiving the requested digital identity document from the issuer. Additionally, the method comprises delivering the received digital identity document to the user.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for delivering a digital identity document. In one embodiment of the present invention, a request is received by a system, referred to herein as the "digital identity document management system," to purchase a digital identity document from a user. A "digital identity document," as used herein, refers to a document or card that is used to identify a person or verify aspects of a person's personal identity in digital form. An acquisition uniform resource locator (URL) with parameters corresponding to the identity of the user (e.g., an identifier of the user's computing device as well as the device's public key) and the requested digital identity document is created and provided to the user by the digital identity document management system. In one embodiment, the user utilizes the received URL to communicate with an issuer (previously verified as being trusted by the digital identity document management system) to request the digital identity document. The digital identity document management system then receives the requested digital identity document in encrypted form from the issuer. In one embodiment, after the issuer receives the request for the digital identity document via the acquisition URL created by the digital identity document management system, the issuer generates the digital identity document using the appropriate private data stored in its secured servers/databases which is later encrypted. In this manner, the digital identity document management system will not have access to the user's private data. The digital identity document management system then delivers the encrypted digital identity document to the user. In this manner, the digital identity document management system is able to deliver to the user an identity document in digital form that has been vetted as trusted in a secure manner thereby reducing the number of occurrences in providing improper identity documents as well as lessening the ability to generate falsified identity documents.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
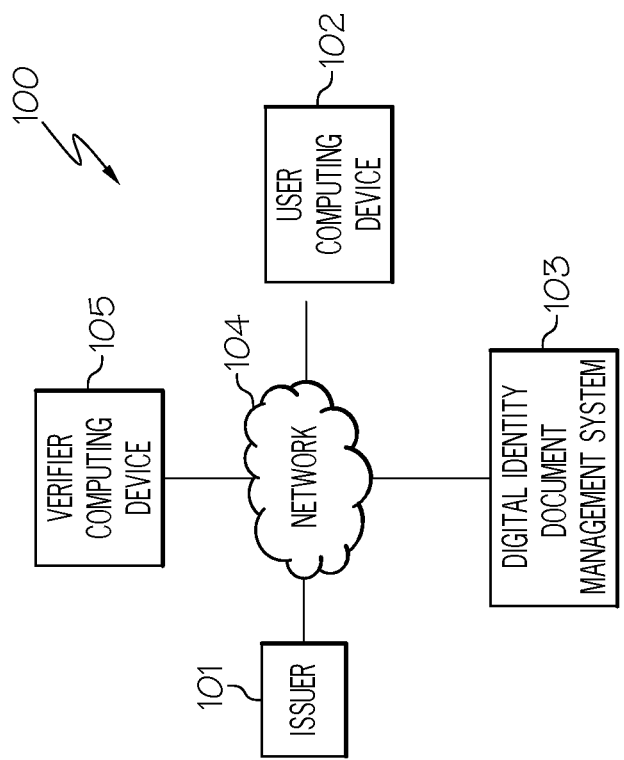
FIG. 1 illustrates a system for delivering a digital identity document configured in accordance with an embodiment of the present invention.

Referring now to the Figures in detail, FIG. 1 illustrates a system 100 for delivering a digital identity document in accordance with an embodiment of the present invention. A "digital identity document," as used herein, refers to a document or card that is used to identify a person or verify aspects of a person's personal identity in digital form. Examples include, but not limited to, a driver's license, a fishing license, a hunting license, a passport, a health insurance card, a firearm owner's identification card, a boating license, and a commercial driver's license.

As illustrated in FIG. 1, system 100 includes an issuer 101 (e.g., organization that provides members proof of membership, a company that issues proof of employment badges, a government agency, such as the department of motor vehicles) that is responsible for issuing a digital identity document based on data stored on secured servers/databases (not shown in FIG. 1) accessible by issuer 101. Such data includes personal data of users, such as name, address, birthdate, height and eye color. The principles of the present invention are not to be limited in scope to particular types of identity documents or the data stored to generate such identity documents. The principles of the present invention are to include any type of identity document that is used for identifying a person or verifying aspects of a person's personal identity regardless of the type of data in the identity document.

System 100 further includes a user computing device 102 (the user's computing device as well as the user himself/herself may each be identified with element number 102) connected to issuer 101 and a digital identity document management system 103 via a network 104. Computing device 102 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 104 and consequently communicating with issuer 101 and digital identity document management system 103 as discussed herein.

Network 104 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Digital identity document management system 103 is configured to deliver a digital identity document requested by a user of computing device 102 in such a manner where the digital identity document is vetted as trusted in a secured manner. In one embodiment, digital identity document management system 103 does not have access to the user's private data stored by issuer 101. Instead, as discussed further below, the digital identity document requested by the user of computing device 102 is provided to digital identity document management system 103 in encrypted form by issuer 101 which is then delivered to the user of computing device 102 in encrypted form. In this manner, digital identity document management system 103 will not have access to the user's private data. In one embodiment, digital identity document management system 103 stores the encrypted digital identity documents and manages the users' devices 102 and verifiers' devices 105. In one embodiment, digital identity document management system 103 provides the services of delivering a digital identity document requested by a user of computing device 102 as a cloud service. A hardware configuration of digital identity document management system 103 is discussed below in connection with FIG. 2.

Furthermore, as illustrated in FIG. 1, a verifier computing device 105 (the verifier's computing device as well as the verifier himself/herself may each be identified with element number 105) is connected to network 104 to allow a verifier 105, such as a law enforcement officer or a merchant, to attempt to verify attribute values (e.g., age) in the digital identity document (e.g., driver's license) delivered to the user of computing device 102. Such a verification process may be referred to as a "challenge." For instance, a police officer may attempt to verify the age of the user indicated in a digital driver's license using a mobile scanner. The police officer may be said to issue a challenge to the user 102 (also referred to as the "owner") as to the validity of the attribute values contained in the digital identity document. The user or owner then responds to the challenge with the requested attribute values in response to receiving a verified role (e.g., law enforcement role) from verifier 105 that indicates that verifier 105 has the authority to access such attribute values. Such a verified role is provided to verifier 105 from issuer 101 via digital identity document management system 103 as discussed further below.

System 100 is not to be limited in scope to any one particular network architecture. System 100 may include any number of issuers 101, user computing devices 102, digital identity document management systems 103, networks 104 and verifier computing devices 105.

Figure 2:
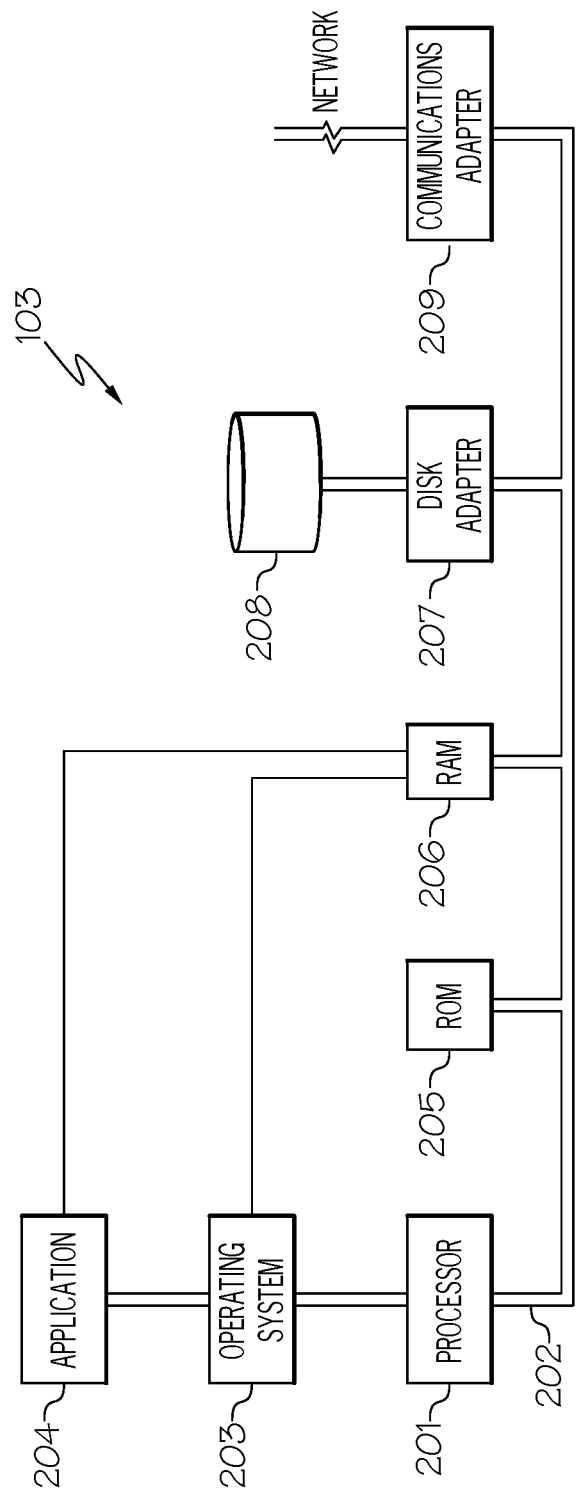
FIG. 2 illustrates a hardware configuration of a digital identity document management system for practicing the principles of the present invention in accordance with an embodiment of the present invention.

Referring now to FIG. 2, FIG. 2 illustrates a hardware configuration of digital identity document management system 103 (FIG. 1) which is representative of a hardware environment for practicing the present invention. Referring to FIG. 2, digital identity document management system 103 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for delivering a digital identity document as discussed below in connection with FIGS. 3-5.

Referring again to FIG. 2, read-only memory ("ROM") 205 is coupled to system bus 202 and includes a basic input/output system ("BIOS") that controls certain basic functions of digital identity document management system 103. Random access memory ("RAM") 206 and disk adapter 207 are also coupled to system bus 202. It should be noted that software components including operating system 203 and application 204 may be loaded into RAM 206, which may be digital identity document management system's 103 main memory for execution. Disk adapter 207 may be an integrated drive electronics ("IDE") adapter that communicates with a disk unit 208, e.g., disk drive. It is noted that the program for delivering a digital identity document, as discussed further below in connection with FIGS. 3-5, may reside in disk unit 208 or in application 204.

Digital identity document management system 103 may further include a communications adapter 209 coupled to bus 202. Communications adapter 209 interconnects bus 202 with an outside network (e.g., network 104 of FIG. 1) thereby enabling digital identity document management system 103 to communicate with other devices (e.g., issuer 101, user computing device 102 and verifier computing device 105 of FIG. 1).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, institutions, such as government agencies (e.g., department of motor vehicles), issue identity cards or documents which may be used to identify a person or verify aspects of a person's personal identity. Identity documents may include, for example, a driver's license, a fishing license, a hunting license, a passport, a health insurance card, a firearm owner's identification card, a boating license, a commercial driver's license, etc. Typically, such identity documents are issued in the form of a thermal plastic card or paper by these institutions (also referred to as "issuer") based on user data (e.g., name, address, birthdate, height, etc. of the user) stored in databases. Unfortunately, by relying upon thermal plastic cards or paper, problems may arise, such as providing improper identity documents as well as the ease in generating falsified identity documents. For example, incorrectly printed driver licenses may have been mailed to non-citizens. For instance, such driver licenses may not indicate the status of the recipient being a non-citizen. In such a situation, such driver licenses will need to be reprinted. Furthermore, there is not an easy solution in obtaining those incorrectly printed driver licenses to prevent abuse in the driving system and elsewhere. Hence, the current process in issuing identity documents in the form of thermal plastic cards or paper is deficient in terms of security and accuracy.

The principles of the present invention provide a means for allowing institutions to no longer rely upon thermal plastic cards or paper for identity documents, but instead, to be able to issue an identity document in digital form so as to reduce the number of occurrences in providing improper identity documents as well as to lessen the ability to generate falsified identity documents. Furthermore, the principles of the present invention provide a mechanism whereby issuers (e.g., government agency) of identity documents in digital form will be able to obtain an additional source of revenue. Additionally, the principles of the present invention provide a mechanism that reduces the time it takes for a user to obtain his/her identity document. In addition, the principles of the present invention allow a greater availability of identity documents to be issued by issuers and purchased by users.

Figure 3:
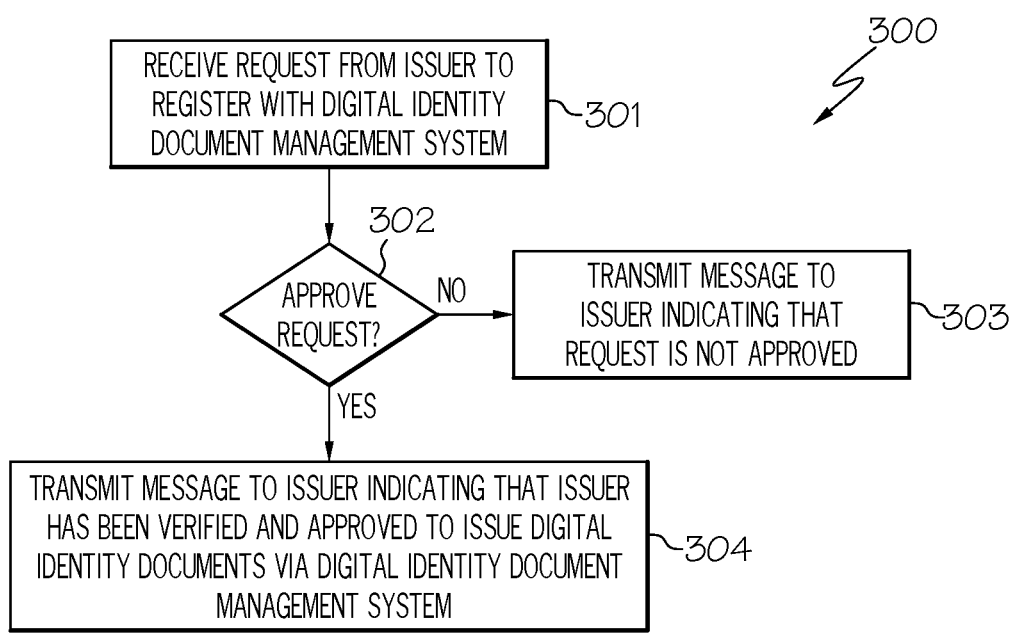
FIG. 3 is a flowchart of a method for verifying the trust of an issuer in accordance with an embodiment of the present invention.
Figure 4:
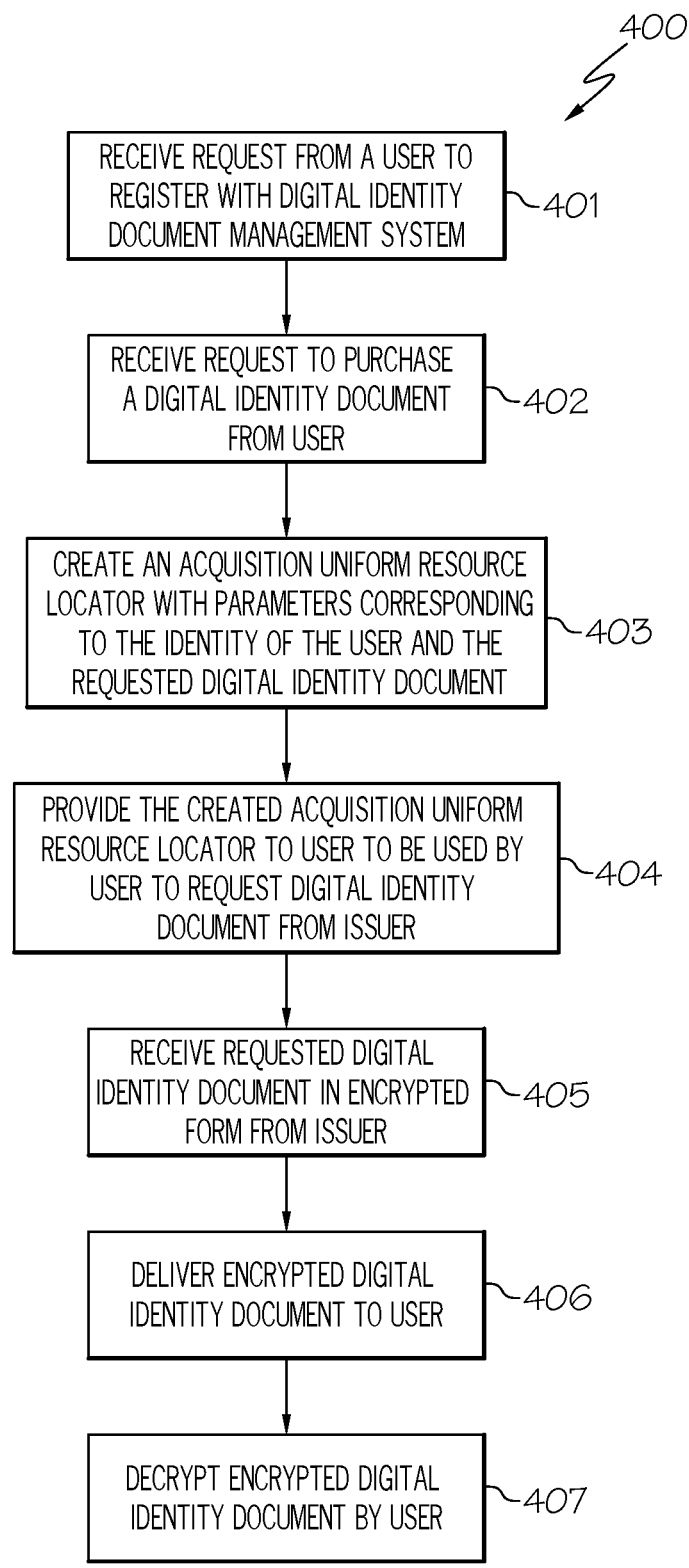
FIG. 4 is a flowchart of a method for delivering the requested digital identity document to the user in accordance with an embodiment of the present invention.
Figure 5:
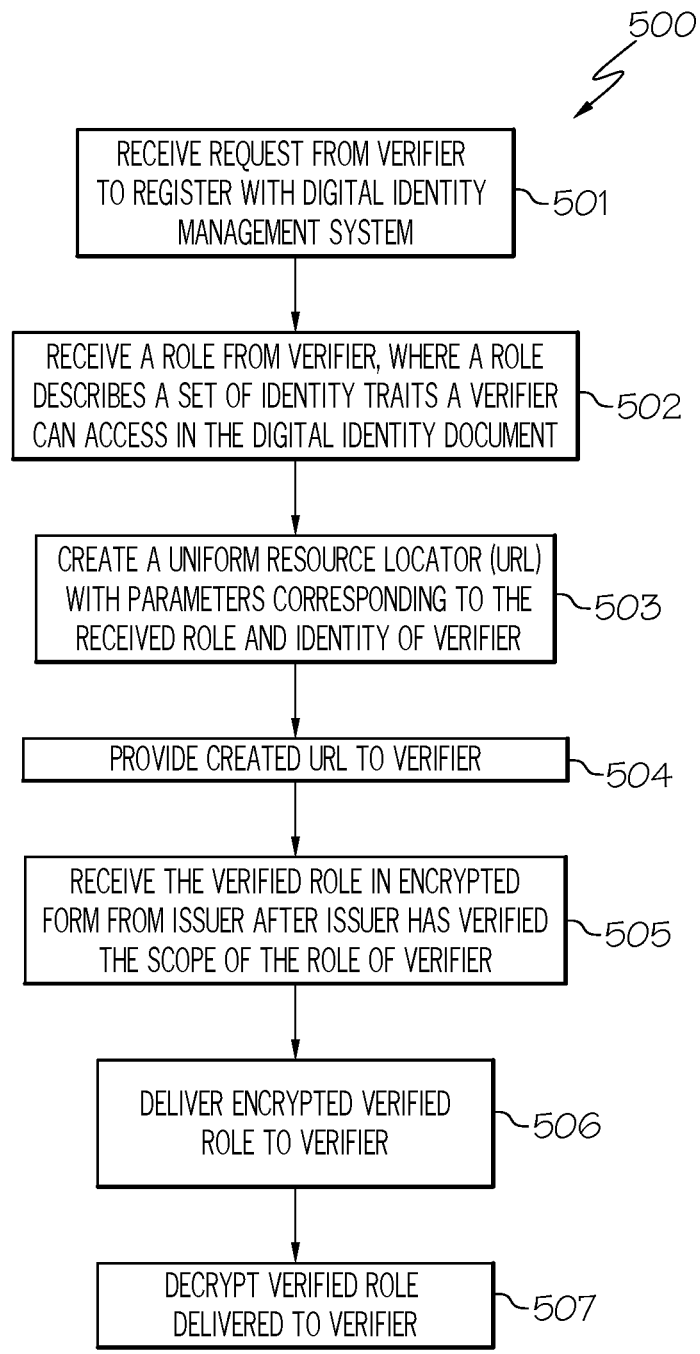
FIG. 5 is a flowchart of a method for providing a verified role to a verifier in accordance with an embodiment of the present invention.

The principles of the present invention provide a mechanism that accomplishes the benefits discussed above, including delivering a digital identity document to a user (e.g., user of computing device 102 of FIG. 1) that is vetted as trusted in a secured manner, as discussed below in connection with FIGS. 3-5. FIG. 3 is a flowchart of a method for verifying the trust of an issuer 101 of FIG. 1 (e.g., government agency). FIG. 4 is a flowchart of a method for delivering the requested digital identity document to the user. FIG. 5 is a flowchart of a method for providing a verified role to verifier 105 (FIG. 1).

As stated above, FIG. 3 is a flowchart of a method 300 for verifying the trust of an issuer 101 (e.g., government agency, school, company) in accordance with an embodiment of the present invention. Verifying the trust of issuer 101 is important in order to ensure that the digital identity document delivered to the user of computing device 102 is indeed authentic.

Referring to FIG. 3, in conjunction with FIGS. 1-2, in step 301, digital identity document management system 103 receives a request from issuer 101 to register with digital identity document management system 103. Registering, as used herein, refers to the ability of issuer 101 to provide digital identity documents to users 102 via digital identity document management system 103.

In step 302, a determination is made by digital identity document management system 103 as to whether the request to register with digital identity document management system 103 has been approved. In one embodiment, an account representative of digital identity document management system 103 determines whether the request to register with digital identity document management system 103 is to be approved. In one embodiment, the account representative is a physical person that validates the identity and approval of issuer 101 to issue digital identity documents via digital identity document management system 103, such as by communicating with persons of authority at issuer 101.

If the request to register with digital identity document management system 103 has not been approved, then, in step 303, digital identity document management system 103 transmits a message to issuer 101 indicating that the request is not approved.

If, however, the request to register with digital identity document management system 103 has been approved, then, in step 304, digital identity document management system 103 transmits a message to issuer 101 indicating that issuer 101 has been verified and approved to issue digital identity documents via digital identity document management system 103.

After verifying the trust of issuer 101, digital identity document management system 103 may now be able to deliver digital identity documents to users 102 issued by issuer 101 as discussed below in connection with FIG. 4.

FIG. 4 is a flowchart of a method 400 for delivering the requested digital identity document to the user 102 (FIG. 1) in accordance with an embodiment of the present invention.

Referring to FIG. 4, in conjunction with FIGS. 1-2, in step 401, digital identity document management system 103 receives a request from the user of computing device 102 to register with digital identity document management system 103. In one embodiment, registration may involve acquiring information that may be used to establish the identity of user 102, such as name, address, social security number, etc. In one embodiment, registration may involve acquiring an identifier of the user's computing device 102 as well as the device's public key. In one embodiment, each digital identity document is generated on a per device basis. For example, if user 102 desires to purchase a digital identity document to be generated on the user's smartphone as well as the user's tablet, then digital identity document management system 103 may acquire an identifier and a public key from each separate device which will be used to generate separate acquisition uniform resource locators discussed below.

In step 402, digital identity document management system 103 receives a request to purchase a digital identity document from the user of computing device 102. In one embodiment, user 102 may be presented with a user interface to select one or more digital identity documents (e.g., a driver's license, a fishing license, a hunting license, a passport, a health insurance card, a firearm owner's identification card, a boating license, a commercial driver's license, etc.) to purchase from issuer 101.

In step 403, digital identity document management system 103 creates an acquisition uniform resource locator (URL) with parameters corresponding to the identity of user 102 (obtained in step 401), which may include an identifier of the user's computing device 102 as well as the device's public key, and the requested digital identity document to be purchased. Such a URL is to be used by user 102 to contact issuer 101 to obtain the requested digital identity document. In one embodiment, such an acquisition URL is created only after user 102 has registered with digital identity document management system 103.

In step 404, digital identity document management system 103 provides the created acquisition URL to user 102 to be used by user 102 to request the digital identity document from issuer 101. In one embodiment, the user of computing device 102 utilizes the received URL to communicate with issuer 101 to request the digital identity document to be purchased.

In step 405, digital identity document management system 103 receives the requested digital identity document in encrypted form from the issuer 101. In one embodiment, after the issuer 101 receives the request for the digital identity document via the acquisition URL created by digital identity document management system 103, issuer 101 generates the digital identity document using the appropriate private data stored in its secured servers/databases which is later encrypted, such as via the user's device's public key. In this manner, digital identity document management system 103 will not have access to the user's private data. In one embodiment, issuer 101 only provides the requested digital identity document in encrypted form to digital identity document management system 103 after user 102 has made payment to issuer 101 to purchase the requested digital identity document.

In step 406, digital identity document management system 103 delivers the encrypted digital identity document to the user of computing device 102. In this manner, digital identity document management system 103 is able to deliver to user 102 an identity document in digital form that has been vetted as trusted in a secure manner thereby reducing the number of occurrences in providing improper identity documents as well as lessening the ability to generate falsified identity documents.

In step 407, the user of computing device 102 decrypts the encrypted digital identity document. In one embodiment, user 102 decrypts the encrypted digital identity document using the user's device's private/secret key. In such a manner, digital identity document management system 103 will not be able to decrypt the encrypted digital identity document since digital identity document management system 103 does not have access to the user's device's private/secret key. As a result, digital identity document management system 103 will not have access to the user's private data. Furthermore, no other person will be able to access the user's private data since they do not have access to the user's device's private/secret key.

After receiving the digital identity document, a verifier 105 (e.g., law enforcement officer, merchant) may want to verify the attribute values (e.g., name, address, age) contained in the digital identity document. Verifier 105 may issue a challenge to user 102 (also referred to as the "owner") as to the validity of the attribute values contained in the digital identity document. The user or owner then responds to the challenge with the requested attribute values in response to receiving a verified role from verifier 105 that indicates that verifier 105 has the authority to access such attribute values. Such a verified role is provided to verifier 105 from issuer 101 via digital identity document management system 103 as discussed below in connection with FIG. 5.

FIG. 5 is a flowchart of a method 500 for providing a verified role to verifier 105 in accordance with an embodiment of the present invention.

Referring to FIG. 5, in conjunction with FIGS. 1-2, in step 501, digital identity document management system 103 receives a request from verifier 105 to register with digital identity document management system 103.

In step 502, digital identity document management system 103 receives a role (e.g., merchant role, law enforcement role) from verifier 105, where a role describes a set of identity traits a verifier 105 can access in the digital identity document. In one embodiment, verifier 105 is presented with a list of roles from digital identity document management system 103, such as via a user interface.

In step 503, digital identity document management system 103 creates a uniform resource locator (URL) with parameters corresponding to the received role and identity of the verifier 105 (obtained in step 501), which may include information, such as an account number (generated during step 501), an identifier of the verifier's 105 computing device as well as the device's public key. Such a URL is to be used by verifier 105 to contact issuer 101 to verify the role of verifier 105. "Verifying role," as used herein, refers to establishing which attribute values (e.g., birthdate, name, address) verifier 105 in such a role (e.g., merchant role) has authority to access in the user's digital identity document.

In step 504, digital identity document management system 103 provides the created URL to verifier 105 to be used by verifier 105 to verify the role with issuer 101.

In step 505, digital identity document management system 103 receives the verified role in encrypted form from issuer 101 after issuer 101 has verified the scope of the role of verifier 105. That is, document management system 103 receives the verified role from issuer 101 after issuer 101 has determined which attribute values verifier 105 in such a role has authority to access in the user's digital identity document. In one embodiment, the verified role is encrypted by issuer 101, such as via the verifier's device's public key. In one embodiment, after the issuer 101 receives the request to verify a role from verifier 105 via the URL created by digital identity document management system 103, issuer 101 verifies the received role, such as by having verifier 105 enter credentials (e.g., badge number) in an appropriate government website (e.g., law enforcement website).

In step 506, digital identity document management system 103 delivers the encrypted verified role to verifier 105 to be used by verifier 105 in challenging the digital identity document delivered to user 102.

In step 507, verifier 105 decrypts the encrypted verified role. In one embodiment, verifier 105 decrypts the encrypted verified role using the verifier's device's private/secret key.

Such a verified role may then be provided to user 102 during a challenge. Upon receipt of the challenge and the verified role, user 102 will provide verifier 105 the requested attribute values for those that are within the scope of the role granted to verifier 105 by issuer 101.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for delivering a digital identity document, the computer program product comprising a computer readable storage medium having program code embodied therewith, the program code comprising the programming instructions when executed by one or more processors causes the one or more processors to perform the steps of:

receiving a request from an issuer to register with a management system;

transmitting a message to said issuer by said management system indicating that said issuer has been approved to issue digital identity documents to users via said management system in response to approving said request from said issuer to register with said management system;

presenting one or more digital identity documents to a user to be purchased by said user;

receiving a selection of a digital identity document out of said one or more digital identity documents from said user to be purchased;

creating, by said management system, an acquisition uniform resource locator with parameters corresponding to an identity of said user and said selected digital identity document;

providing, by said management system, said created acquisition uniform resource locator to a computing device of said user to be used by said user to request said digital identity document from said issuer;

receiving, by said management system, said requested digital identity document from said issuer, wherein said issuer receives a request for said digital identity document from said user via said acquisition uniform resource locator identifying said user and said digital identity document, wherein said issuer generates said requested digital identity document using private data of said user stored in a database;

delivering, by said management system, said received digital identity document to said computing device of said user;

presenting a list of roles to a computing device of a verifier;

receiving a selection of a role from said list of roles from said verifier, wherein said role describes a set of identity traits said verifier can access in said digital identity document; and creating a uniform resource locator with parameters corresponding to said received selected role and an identity of said verifier corresponding to an identifier of said computing device of said verifier and a public key of said computing device of said verifier.

2. The computer program product as recited in claim 1, wherein said requested digital identity document received from said issuer is in encrypted form and delivered to said user in said encrypted form.

3. The computer program product as recited in claim 1, wherein said identity of said user comprises an identifier of said computing device of said user as well as a public key of said computing device of said user.

4. The computer program product as recited in claim 1, wherein the program code further comprises the programming instructions when executed by the one or more processors causes the one or more processors to further perform the steps of:

receiving a request from said user to register;

acquiring an identifier of said computing device of said user and a public key of said computing device of said user in order to register said user; and registering said user, wherein said creating of said acquisition uniform resource locator with parameters corresponding to said identity of said user and said selected digital identity document is in response to registering said user.

5. The computer program product as recited in claim 1, wherein the program code further comprises the programming instructions when executed by the one or more processors causes the one or more processors to further perform the steps of:

providing said created uniform resource locator to said verifier to be used by said verifier to verify said role with said issuer;

receiving a verified role in encrypted form from said issuer after said issuer has verified said role of said verifier which involves determining which attribute values said verifier has authority to access in said digital identity document; and delivering said encrypted verified role to said verifier to be used by said verifier in challenging said digital identity document delivered to said user.

6. The computer program product as recited in claim 1, wherein said digital identity document comprises one of the following in digital form: a driver's license, a fishing license, a hunting license, a passport, a health insurance card, a firearm owner's identification card, a boating license, and a commercial driver's license.

7. The computer program product as recited in claim 1, wherein said issuer is a government agency.

8. The computer program product as recited in claim 1, wherein the program code further comprises the programming instructions when executed by the one or more processors causes the one or more processors to further perform the step of:

receiving said requested digital identity document from said issuer only after said user has made payment to said issuer to purchase said requested digital identity document.

9. The computer program product as recited in claim 1, wherein the program code further comprises the programming instructions when executed by the one or more processors causes the one or more processors to further perform the step of:

transmitting a message to said issuer by said management system indicating that said request to register with said management system has not been approved in response to not approving said request to register with said management system.

10. The computer program product as recited in claim 1, wherein said verifier comprises one of the following: a law enforcement officer and a merchant.

11. A system, comprising:

a memory for storing a computer program for delivering a digital identity document; and a processor connected to the memory, wherein the computer program when executed by the processor causes the processor to perform the steps of:

receiving a request from an issuer to register with a management system;

transmitting a message to said issuer by said management system indicating that said issuer has been approved to issue digital identity documents to users via said management system in response to approving said request from said issuer to register with said management system;

presenting one or more digital identity documents to a user to be purchased by said user;

receiving a selection of a digital identity document out of said one or more digital identity documents from said user to be purchased;

creating, by said management system, an acquisition uniform resource locator with parameters corresponding to an identity of said user and said selected digital identity document;

providing, by said management system, said created acquisition uniform resource locator to a computing device of said user to be used by said user to request said digital identity document from said issuer;

receiving, by said management system, said requested digital identity document from said issuer, wherein said issuer receives a request for said digital identity document from said user via said acquisition uniform resource locator identifying said user and said digital identity document, wherein said issuer generates said requested digital identity document using private data of said user stored in a database;

delivering, by said management system, said received digital identity document to said computing device of said user;

presenting a list of roles to a computing device of a verifier;

receiving a selection of a role from said list of roles from said verifier, wherein said role describes a set of identity traits said verifier can access in said digital identity document; and creating a uniform resource locator with parameters corresponding to said received selected role and an identity of said verifier corresponding to an identifier of said computing device of said verifier and a public key of said computing device of said verifier.

12. The system as recited in claim 11, wherein said requested digital identity document received from said issuer is in encrypted form and delivered to said user in said encrypted form.

13. The system as recited in claim 11, wherein said identity of said user comprises an identifier of said computing device of said user as well as a public key of said computing device of said user.

14. The system as recited in claim 11, wherein the computer program when executed by the processor causes the processor to further perform the steps of:

receiving a request from said user to register;

acquiring an identifier of a computing device of said user and a public key of said computing device of said user in order to register said user; and registering said user, wherein said creating of said acquisition uniform resource locator with parameters corresponding to said identity of said user and said digital identity document is in response to registering said user.

15. The system as recited in claim 11, wherein the computer program when executed by the processor causes the processor to further perform the steps of:

providing said created uniform resource locator to said verifier to be used by said verifier to verify said role with said issuer;

receiving a verified role in encrypted form from said issuer after said issuer has verified said role of said verifier which involves determining which attribute values said verifier has authority to access in said digital identity document; and delivering said encrypted verified role to said verifier to be used by said verifier in challenging said digital identity document delivered to said user.

16. The system as recited in claim 11, wherein said digital identity document comprises one of the following in digital form: a driver's license, a fishing license, a hunting license, a passport, a health insurance card, a firearm owner's identification card, a boating license, and a commercial driver's license.

17. The system as recited in claim 11, wherein said issuer is a government agency.

18. The system as recited in claim 11, wherein the computer program when executed by the processor causes the processor to further perform the step of:

receiving said requested digital identity document from said issuer only after said user has made payment to said issuer to purchase said requested digital identity document.

19. The system as recited in claim 11, wherein the computer program when executed by the processor causes the processor to further perform the step of:

transmitting a message to said issuer by said management system indicating that said request to register with said management system has not been approved in response to not approving said request to register with said management system.

20. The system as recited in claim 11, wherein said verifier comprises one of the following: a law enforcement officer and a merchant.

* * * * *